G. P. RIZA.
FISH CATCHING DEVICE.
APPLICATION FILED FEB. 15, 1921.
1,405,740.
Patented Feb. 7, 1922.
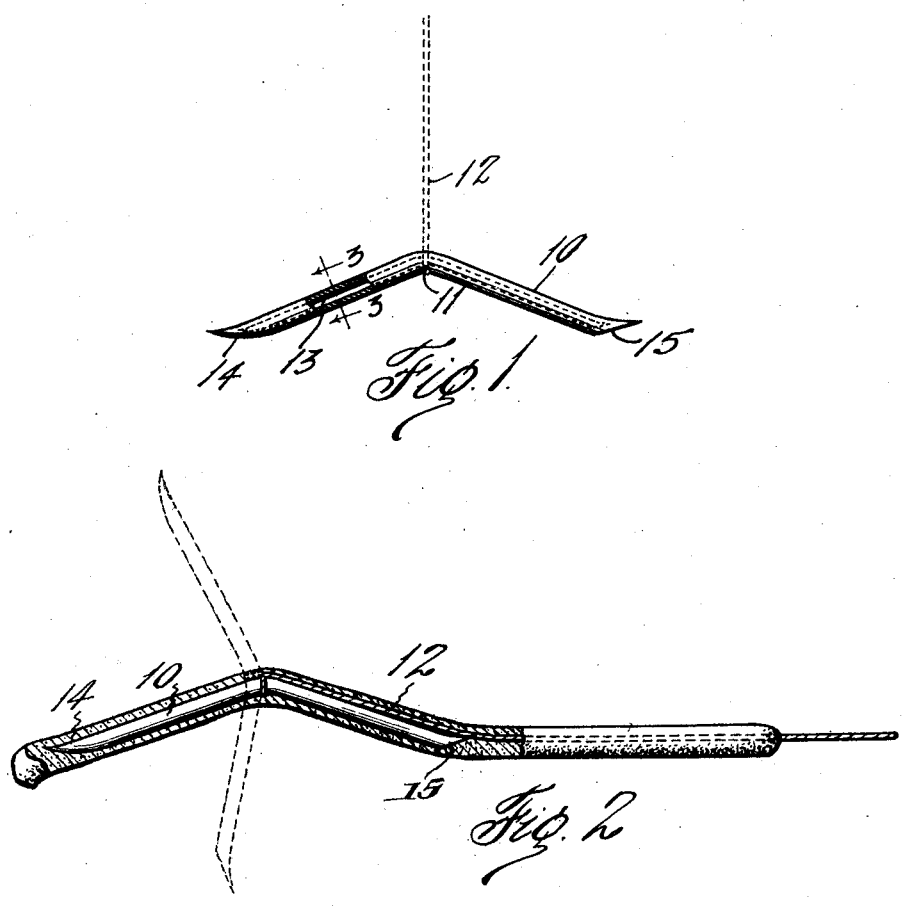

UNITED STATES PATENT OFFICE.

GEORGE P. RIZA, OF DALLAS, TEXAS.

FISH-CATCHING DEVICE.

1,405,740.     Specification of Letters Patent.     Patented Feb. 7, 1922.

Application filed February 15, 1921. Serial No. 445,095.

*To all whom it may concern:*

Be it known that I, GEORGE P. RIZA, a citizen of the United States, residing at Dallas in the county of Dallas and State of Texas, have invented certain new and useful Improvements in Fish-Catching Devices, of which the following is a specification.

This invention relates to new and useful improvements in fish catching devices.

The object of the invention is to provide a device which may be completely concealed in the bait in such a manner as not to distort the bait into an unnatural position or one simulating a hook. Another object is to provide a bait holding device which will lie in a horizontal or slightly inclined position when being used.

In carrying out the invention an elongated member is bent intermediate its ends and adapted to be attached at its central portion to a supporting cord. The ends of the member are pointed so as to catch in the mouth of the fish. An important point is to make the member either hollow or light enough to float or nearly so, when carrying the bait.

A construction designed to carry out the invention will be hereinafter described together with other features of the invention.

The invention will be more readily understood from a reading of the following specification and by reference to the accompanying drawings, in which an example of the invention is shown and wherein:

Fig. 1 is a view of a device embodying my invention, and suspended without the bait, Fig. 2 is a view showing the device in position in the bait and indicating in dotted lines, its catching position, and Fig. 3 is a cross-section on the line 3—3 of Fig. 1.

In the drawings the numeral 10 designates an elongated member bent intermediate its ends at an obtuse angle or similarly shaped. At its central portion the member has a shallow notch 11 within the angle to receive the cord 12 so that the latter will not be displaced on the member. It is highly desirable but not essential, that the member be capable of floating or semi-floating and while metal seems to be the best material, the invention is not to be so limited.

In order to assure a floating member, it may be provided with a longitudinal cavity 13 sealed at its ends.

One end of the member is reduced to a point 14 and the other end 15 is beveled. Both ends are reduced to sharp points which are bent outwardly so as to more readily catch in the mouth of the fish. The exact shape of the ends of the member is not essential, but by one end being blunt and the other sharper, the latter will more readily penetrate.

In using the device the member is threaded into the body of the worm or other bait as is shown in Fig. 2. The member is swung so that one section lies along the cord which is concealed by the bait. When the baited device is dropped into the water it will assume either a horizontal or nearly horizontal position. Where there is a current it would tend to swing the member into a horizontal position, even though it was made of solid metal.

The bait may be left extending from the end of the member and the worm will not be distorted enough by the member to be noticeable by the fish. The fish upon swallowing the bait will pull on the cord 12 so that either the member or the cord will break through the worm and assume a crosswise position as is shown in dotted lines in Fig. 2. The pointed ends will of course catch in the throat of the fish and hold it on the line.

Various changes may be made in the size and shape of the device without departing from the spirit of the invention.

What I claim, is:

1. In a fish catching device, an elongated member bent out of a straight line and having pointed ends, said member being adapted to be attached intermediate its ends to a fishing cord, said member having an enclosed cavity.

2. In a fish catching device, an elongated buoyant member bent out of a straight line and having pointed ends, said member being adapted to be attached intermediate its ends to a fishing cord.

In testimony whereof I affix my signature.

GEORGE P. RIZA.